United States Patent [19]
Kletsky et al.

[11] Patent Number: 5,751,766
[45] Date of Patent: May 12, 1998

[54] NON-INVASIVE DIGITAL COMMUNICATIONS TEST SYSTEM

[75] Inventors: Jeffrey Marc Kletsky, San Francisco; Ernest T. Tsui, Cupertino, both of Calif.

[73] Assignee: Applied Signal Technology, Inc., Sunnyvale, Calif.

[21] Appl. No.: 532,017

[22] Filed: Sep. 21, 1995

Related U.S. Application Data

[63] Continuation-in-part of Ser. No. 430,909, Apr. 27, 1995, abandoned.

[51] Int. Cl.⁶ ............................................. H04B 3/46
[52] U.S. Cl. ..................... 375/224; 375/225; 375/228; 375/285; 375/326; 375/344; 375/346; 348/184; 348/192; 348/193; 364/554
[58] Field of Search ........................... 348/180, 184, 348/192, 193; 371/20.1, 20.3; 379/6, 22; 375/213, 224–228, 229, 231, 259, 261, 271, 278, 285, 316, 322, 326, 329, 344, 346, 350, 377; 364/554, 550

[56] References Cited

U.S. PATENT DOCUMENTS

| | | |
|---|---|---|
| 4,381,546 | 4/1983 | Armstrong . |
| 4,384,354 | 5/1983 | Crawford et al. . |
| 4,408,227 | 10/1983 | Bradley ............................ 348/192 |
| 4,639,934 | 1/1987 | Zuranski et al. .................. 375/226 |
| 4,985,900 | 1/1991 | Rhind et al. ...................... 375/226 |
| 5,144,642 | 9/1992 | Weinberg et al. . |
| 5,233,628 | 8/1993 | Rappaport et al. . |
| 5,416,799 | 5/1995 | Currivan et al. . |
| 5,434,884 | 7/1995 | Rushing et al. ................... 375/235 |
| 5,490,199 | 2/1996 | Fuller et al. . |
| 5,517,522 | 5/1996 | Arweiler et al. . |
| 5,533,067 | 7/1996 | Jamal et al. . |

OTHER PUBLICATIONS

Helen Chen, "Testing Digital Video," *Digital Measurements*, Hewlett Packard Brochure 5964–1824E, pp. 1–11, (most recent reference dated Dec. 1994).

Helen Chen, "Testing Digital Video—Part 2," *Digital Measurements*, Communication Technology, June 1995, pp. 80–98.

Gooch, et al., "Blind Channel Identification Using the Constant Modulus Adaptive Algorithm," *International Conference on Communications*, pp. 1–5, Jun. 1988.

Oppenheim, A.V., et al., "Programs for Digital Signal Processing," Edited by the Digital Signal Processing Committee, IEEE Acoustics, Speech and Signal Processing Society, Chapter 7, Cepstral Analysis, pp. 7.0-1—7.2–6, 1979.

Applied Signal Technology, Inc., "User's Manual for PSK/QAM Demodulation and Channel Characterization Using the ZEST, ZRES, & CHID Modules," pp. 1–53, Feb., 1990.

Applied Signal Technology, Inc., Wideband PCM Channel Characterization Study Final Report (vol. 1), Revision 2, pp. 1—4–32, May 1988.

Oppenheim A.V., et al. "Cepsrum Analysis and Homomorphic Deconvolution," *Discrete–Time Signal Processing*, Chapter 12, pp. 768–815, 1989.

*Primary Examiner*—Stephen Chin
*Assistant Examiner*—Amanda T. Le
*Attorney, Agent, or Firm*—Townsend and Townsend and Crew LLP

[57] ABSTRACT

Method and apparatus for non-invasively testing performance of a digital communication system. The test system finds particular application in digital broadcast systems where interruption of regular service for test purposes is impracticable. In one embodiment oriented to digital television cable broadcast systems, unwanted reflections due to loose connectors and other causes may be localized within a subscriber's home. The test system takes advantage of information typically generated by digital receivers to correct for communication channel imperfections. Examples of such information include current filter parameters computed for use in an internal adaptive equalizer, internal loop parameters, and the difference between the signal received and a reconstruction of that signal from the symbols estimated by the receiver.

22 Claims, 14 Drawing Sheets

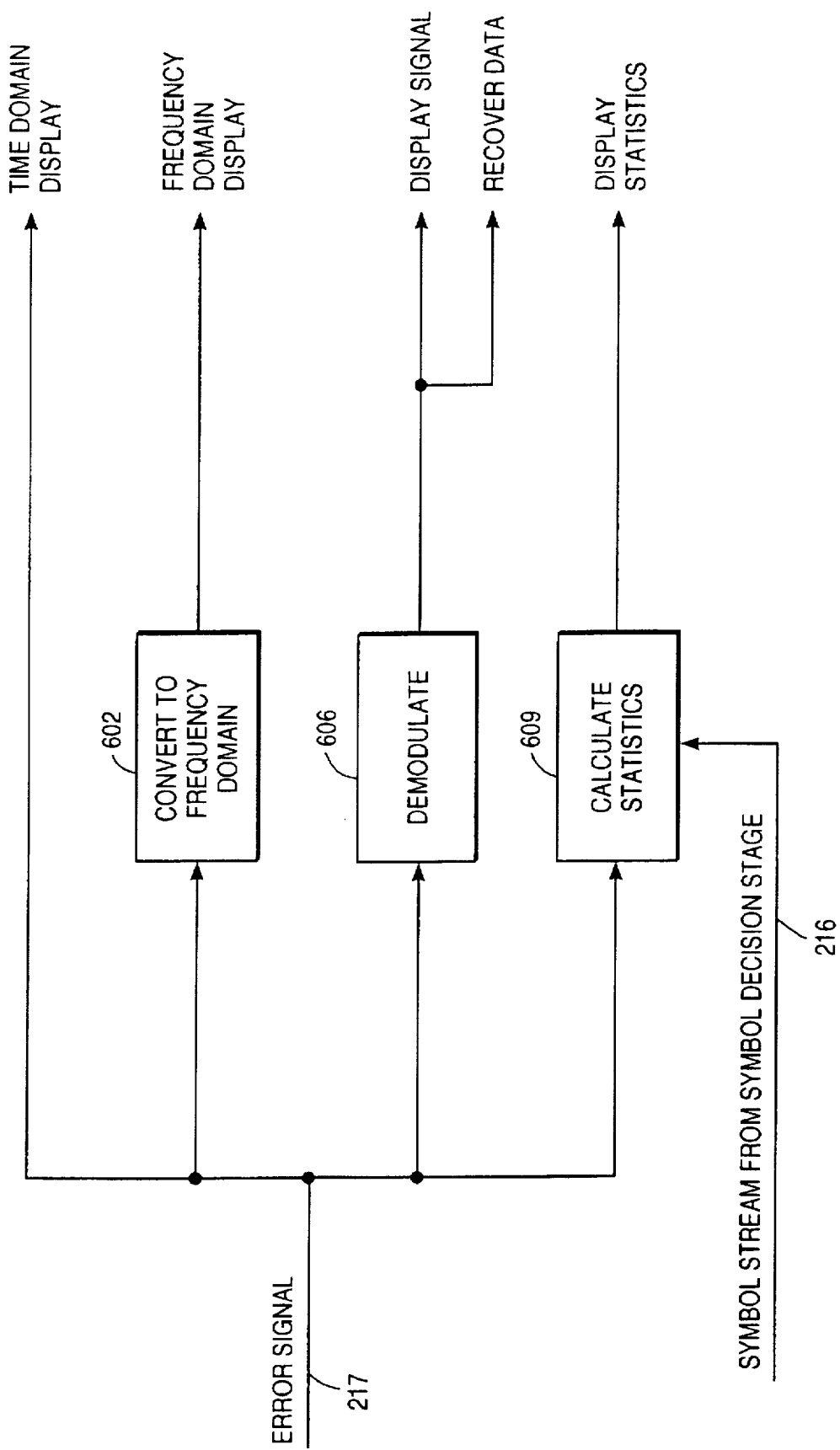

NON-INVASIVE DIGITAL COMMUNICATIONS TEST SYSTEM

CROSS REFERENCE TO RELATED APPLICATION

This application is a continuation-in-part of Ser. No. 08/430,909, filed Apr. 27, 1995, now abandoned.

BACKGROUND OF THE INVENTION

The present invention relates to measuring signal degradation in communications systems. In particular, the invention relates to methods and apparatus for non-invasively measuring performance of a digital broadcast system.

Digital communication technologies offer numerous advantages over their analog predecessors. Nearly error-free transmission is guaranteed if a threshold signal-to-noise ratio is available. Channel distortions may be corrected using adaptive equalizers. Coding techniques may be advantageously employed both to overcome channel-related signal impairments and to minimize usage of bandwidth.

Nonetheless, digital communication system operation is not fault-free. The transmission of information over a physical medium ultimately requires analog components such as RF mixers, amplifiers, oscillators, etc. that are prone to misalignment, temperature caused drift, and various other modes of failure. The physical medium itself also introduces impairments in the form of added noise and reflections. Digital receivers can inherently correct for errors up to a certain threshold, but if that threshold is exceeded, communication is severely impaired.

Digital communication techniques found their earliest application in the context of point-to-point links as would be used by the military or commercial common carriers. In these applications, the link may be tested by interrupting normal service and transmitting test signals. For example, if it is desired to test the link margin of a link, a test signal could be transmitted at progressively reduced power levels until the signal can no longer be accurately received.

Increasingly, digital techniques are being applied to broadcasting. One important example is broadcasting of television signals to numerous subscribers over coaxial cable. Commercial digital broadcast systems require high reliability yet these digital broadcast systems cannot be tested as easily as the point-to-point links. Interrupting normal service for transmission and measurement of test signals is not a commercially viable option.

SUMMARY OF THE INVENTION

The invention provides method and apparatus for non-invasively testing performance of a digital communication system. The test system of the present invention finds particular application in digital broadcast systems where interruption of regular service for test purposes is impracticable. In one embodiment oriented to digital television cable broadcast systems, unwanted reflections due to loose connectors and other causes may be localized within a subscriber's home.

In one embodiment, the present invention takes advantage of information typically generated by digital receivers to correct for communication channel imperfections. Examples of such information include current filter parameters computed for use in an internal adaptive equalizer, internal loop parameters, and the difference between the signal received and a reconstruction of that signal from the symbols estimated by the receiver.

In accordance with one aspect of the invention, the response of the channel is measured non-invasively. An adaptive equalizer within the digital receiver inherently corrects for distortions introduced by the transmitter, medium, and upstream receiver components. The overall response of these elements may be determined by taking a pseudo-inverse of the parameters of digital filters within the adaptive equalizer.

Alternatively, a second adaptive equalizer may be provided having as its input a reconstructed signal representing symbol decisions made based on the output of the first adaptive equalizer. The filter parameters of the second adaptive equalizer are varied to minimize the difference between the second adaptive equalizer output and the first adaptive equalizer input, i.e., the second adaptive equalizer is forced to simulate the overall system response. The filter parameters of the second adaptive equalizer then approximate the overall system response.

Once the overall system response has been determined, known components may be removed by deconvolution. For example if the transmitter and receiver responses are known, the channel response may be determined. If the responses of the transmitter, receiver, and a portion of the channel are known, the response of the remaining portion of the channel may be determined. Also, the location of individual reflections may be more precisely determined by isolating an all-pass component of a channel response of interest. Homomorphic and parametric signal processing techniques may be applied to assist in isolating response components of interest even when response components due to known sources are not known precisely.

A diagnostics tool can extract additional information about the quality of the communication channel using the difference between the signal received and a reconstruction of that signal from the symbols estimated by the demodulator. This "error" signal contains information about interferers, ingress and other impairments and may be displayed in either the time domain or frequency domain. For example, the error signal may displayed in either the frequency or time domain to identify the source of an interference signal. Statistical information generated from the error signal provides the bit error rate and other useful indicia of link performance.

An alternative embodiment of the present invention exploits this error signal to carry further information over the same link. In this embodiment, first and second digital transmitters are coupled to the same communication channel and transmit two carriers within the same bandwidth. The first digital transmitter transmits at a higher power level than does the second. The signal of the first digital transmitter is demodulated using conventional techniques and symbol decisions are made on the demodulated signal. The error signal, as defined above, is itself demodulated to recover information transmitted by the second digital transmitter. This technique could be extended to transmit any number of carriers.

A further aspect of the invention provides for testing the system margin of the communications link by artificially introducing one or more impairments. In one embodiment, an impairment signal having a selected amplitude is added in at an appropriate point in the receiver. The impairment signal may be, e.g., a noise signal to simulate a noise impairment, an amplified version of the error signal to simulate an existing impairment with greater severity, or a series of one or more delayed versions of the reconstructed signal to simulate reflections. To determine the system margin, the impairment signal is varied in amplitude until unacceptable link degradation is observed.

In an alternative embodiment, the reconstructed signal is itself applied to an impairment generator. The impairment generator may add any impairment signal or may apply an impairment transfer function to the reconstructed signal. The output of the impairment generator is then the input to an auxiliary demodulator. To determine the system margin, the degree of impairment is varied until the auxiliary demodulator can no longer acceptably recover the reconstructed signal.

In accordance with a yet further aspect of the invention, monitoring of signals generated by various tracking and/or control loops within a receiver produces information on residual modulation and variation in baud timing. These loops include an Automatic Gain Control (AGC) loop, a symbol timing recovery loop, and a carrier recovery loop. By utilizing parameters obtained from the AGC loop, low frequency amplitude components of equalizer gain, and the radial component of equalizer error, residual AM and hum of the link can be measured. From monitoring carrier recovery loop parameters, the phase component of equalizer response, and angular component of equalizer error, estimates of important communication system parameters, such as phase noise, residual FM, stability, and drift can be formed. Similarly, symbol timing recovery loop parameters, and the delay portion of equalizer gain are used to estimate variations in baud timing. By removing the known dynamics of the tracking loops, these estimates can be better calibrated.

The invention will be better understood by reference to the following detailed description in connection with the accompanying drawings.

BRIEF DESCRIPTION OF THE DRAWINGS

FIG. 6A is a block diagram describing various modes of taking advantage of error signal 217 which represents ingress interference in communications channel 104.

DESCRIPTION OF SPECIFIC EMBODIMENTS

Digital Communications Background

Figure 1:
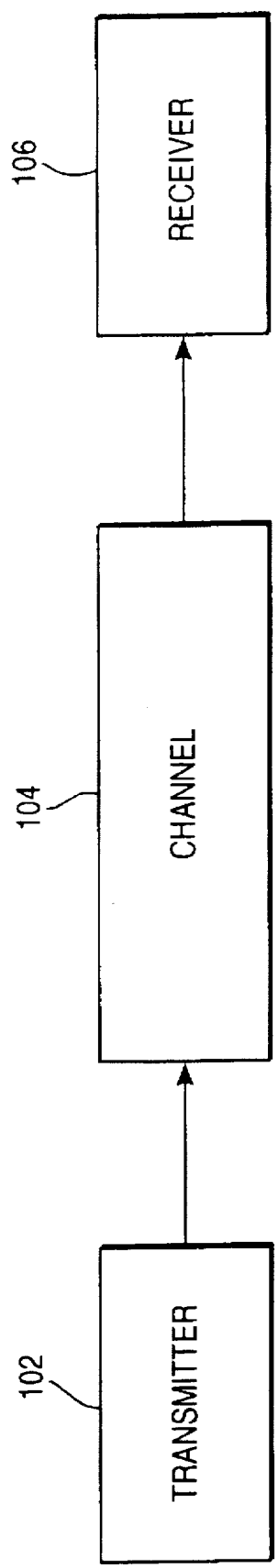
FIG. 1 depicts a simplified representation of a representative digital communication system suitable for testing in accordance with the present invention.

FIG. 1 depicts a simplified representation of a representative digital communication system 100 suitable for testing in accordance with the present invention. Digital communication system 100 includes a transmitter 102, a communications channel 104, and a digital receiver 106. Transmitter 102 receives digital data to be transmitted to receiver 106 and incorporates channel coding, modulation, up-conversion, amplification, and output filtering functions. The present invention is not restricted in application to any particular channel code, digital modulation scheme, or frequency band. Channel 104 represents any physical medium for transferring a signal for transmitter 102 to receiver 106. For example, transmitter channel 104 may represent a coaxial cable delivery system and transmitter 102 may be a cable head-end. Alternatively, channel 104 may represent transmission between a satellite and a ground-based receiver. Furthermore, receiver 106 need not be uniquely coupled to channel 104. Channel 104 may represent a broadcast medium accessible to numerous receivers.

Figure 2A:
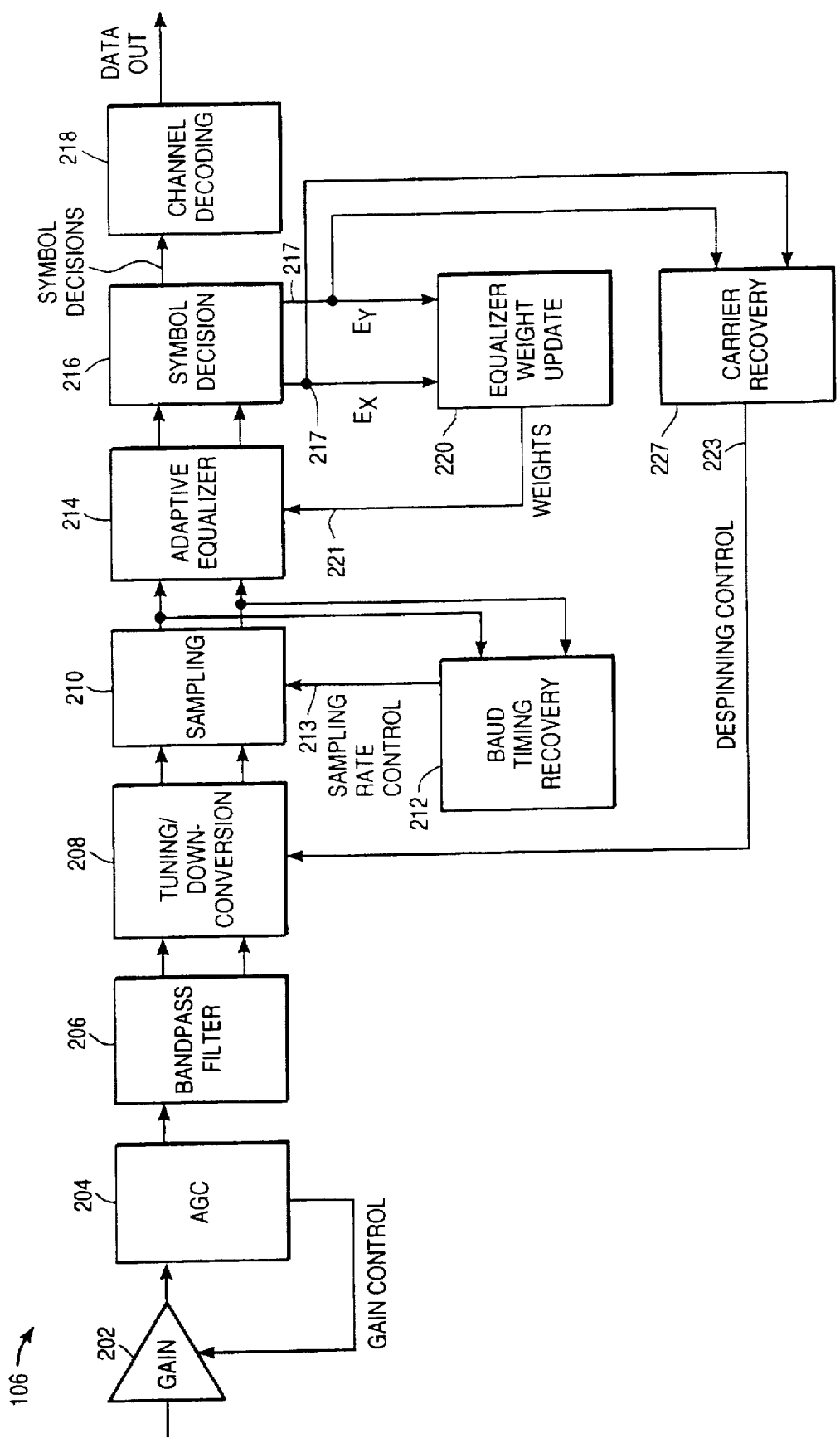
FIG. 2A is a block diagram depicting one implementation of a portion of a digital receiver.

The present invention takes advantage of various signals and data generated internally to digital receiver 106. FIG. 2A is a block diagram depicting one implementation of a portion of digital receiver 106. After filtering and downconversion, a signal received from channel 104 is passed through a variable gain stage 202. The amplified output of gain stage 202 passes through an AGC control circuit 204 which controls the gain of gain stage 202 using a gain control signal 205. A bandpass filter 206 selects a particular range of frequencies so as to guard against later development of unwanted image signals by a tuning/downconversion stage 208. Tuning/downconversion stage 208 selects a particular signal of interest and converts this signal to baseband. Typically, tuning/downconversion stage 208 incorporates at least one voltage controlled oscillator (VCO) which is at least partially controlled by a special control signal developed to minimize residual frequency modulation in the downconverted signal. For modulation schemes that involve two orthogonal components such as QPSK, QAM etc., tuning/downconversion stage 208 develops two outputs corresponding to each orthogonal component. The present invention is not limited to any particular modulation scheme.

Up until this stage, the signals are presumed to be analog and continuous. A sampling stage 210 converts the downconverted signal to a discrete-time digital representation. The sampling rate is synchronized to symbol boundaries within the received data stream by a baud timing recovery loop 212 that generates a sampling rate control signal 213.

An adaptive equalizer 214 automatically corrects for distortions in channel 104 and typically includes a digital FIR filter and/or IIR filter with variable tap weights. (Alternative receiver architectures employ equalizers with fixed tap weights or omit equalization entirely.) A symbol decision stage 216 examines the data output from adaptive equalizer 214 and estimates the transmitted data based on a maximum likelihood decision rule corresponding to the modulation scheme employed. A channel decoding stage 218 removes effects of forward error correction (FEC) or other channel coding schemes employed. Further stages (not shown) may remove source coding, differential coding, scrambling, or compression applied to the transmitted data.

Symbol decision stage 216 also generates an error signal 217 corresponding to the difference between an ideal modulation signal representing the output estimates and input of symbol decision stage 216. This error signal is an input to a weight updating stage 220 that adjusts weights 221 of adaptive equalizer 214 to minimize certain components of the error. A carrier recovery stage 222 also makes use of this error signal to remove residual frequency offset and frequency modulation effects induced in part by tuning/ downconversion stage 208 by controlling the internal VCO with a despinning control signal 223.

Figure 2B:
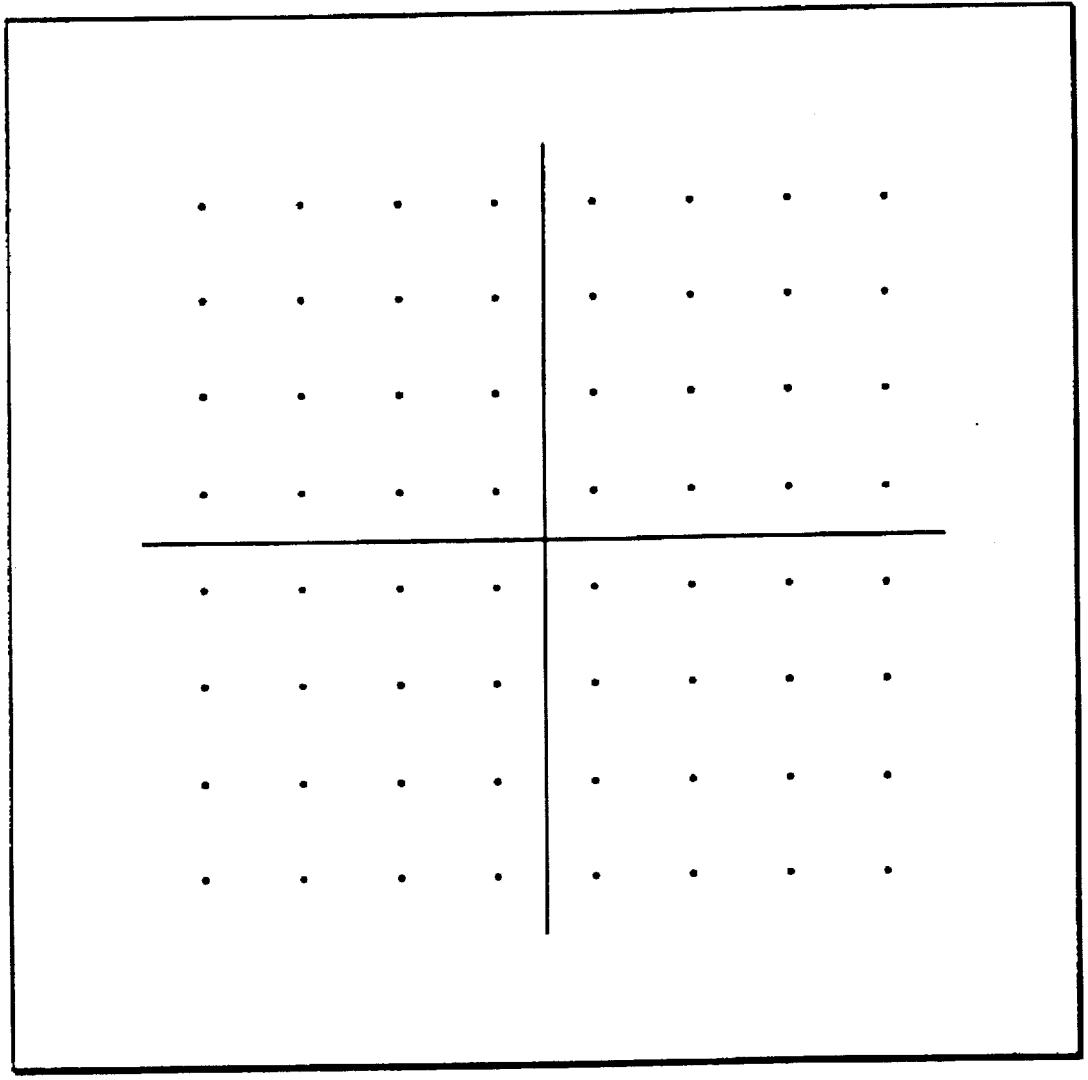
FIG. 2B which depicts a so-called signal constellation for a representative digital modulation scheme, 64 point QAM.

The operation of typical digital communication system 100 will be made clearer by reference to FIG. 2B which depicts a so-called signal constellation for a representative digital modulation scheme 64 point QAM. A signal constellation is a graphical representation of the possible symbols for a given modulation scheme. The horizontal and vertical axes correspond to the orthogonal components of the modulation signal. Each possible symbol is represented by a point at the position of its associated (I,Q) coordinates. As shown in FIG. 2B, 64 point QAM is represented as an array of 64 points. Since $\log_2(64)=6$, the choice of one particular symbol for transmission during a given symbol period communicates 6 bits of information.

Channel 104 introduces noise causing the constellation points to disperse from their ideal locations marked in FIG. 2B. Transmitter filtering and echoing effects within channel 104 introduce inter-symbol interference (ISI) which must be removed by equalization. Also, tuner/downconversion stage 208 introduces residual frequency offset which causes the received signals to "spin" about the origin.

Symbol decision stage 216 essentially receives from adaptive equalizer 214 a series of points in the coordinate space represented by the graph of FIG. 2B and assigns to each point the nearest constellation point as the symbol received. Weight updating stage 220 adjusts equalizer 214 to minimize the distance between the received signal and the constellation point transmitted. Carrier recovery stage 222 operates to minimize the spinning of received points around the origin.

Figure 2C:
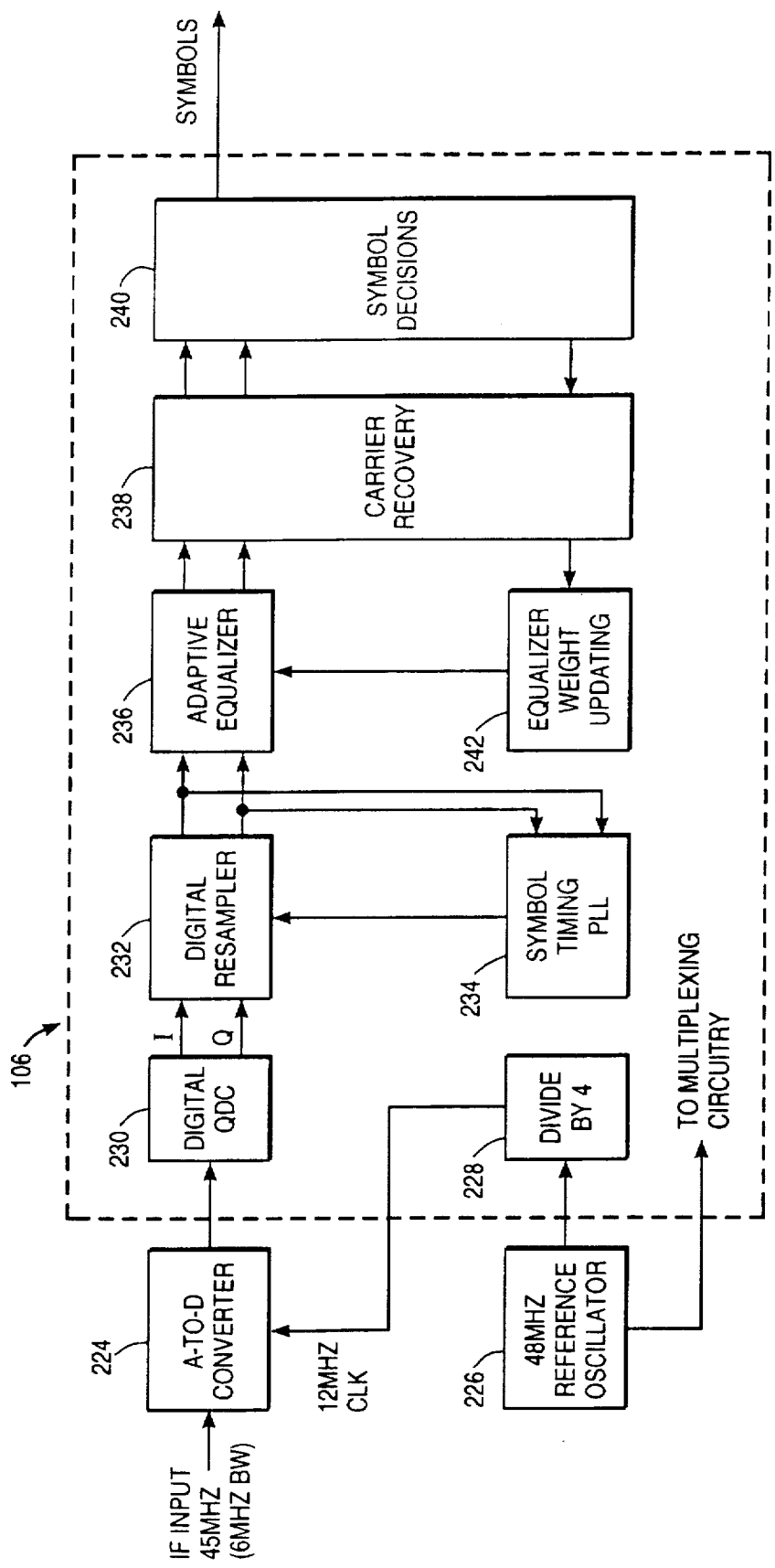
FIG. 2C depicts an alternative implementation of a portion of a digital receiver.

FIG. 2C depicts an alternative implementation of a portion of digital receiver 106 as described in Ser. No. 08/349, 174, now U.S. Pat. No. 5,495,203, Harp et al., EFFICIENT QAM EQUALIZER/DEMODULATOR WITH NON-INTEGER SAMPLING, assigned to the assignee of this application, and the contents of which are herein incorporated by reference for all purposes. This receiver architecture will now be described in brief. An A-D converter 224 corresponds to sampling stage 210 of FIG. 2A but does not operate at baseband but rather accepts an input centered at an IF and samples at a fixed rate determined by a reference oscillator 226 in conjunction with a divide by 4 circuit 228. The fixed sampling rate and IF are chosen in relation to the spectrum of the modulation signal so as to enable digital quadrature direct conversion to baseband by a digital QDC stage 230. A digital resampler 232 synchronizes to the received data in conjunction with a symbol timing phase lock loop 234 analogous to baud timing recovery loop 212. An adaptive equalizer 236 is specially adapted to operate at a sampling rate that is a non-integer fraction of the symbol rate. A carrier recovery stage 238 performs the despinning function directly on the digital data output from equalizer 236 without adjustment of oscillators as in the receiver of FIG. 2A. A symbol decision stage 240 estimates the received data based on the output of carrier recovery stage 238 and generates error signals to drive carrier recovery stage 238 and an equalizer weight updating stage 242.

It can be seen from FIG. 2A and 2C, that digital receivers generate various signals and data that correct for impairments in overall communication system operation. For example, equalizers 214 and 236 correct for echoing and frequency response distortions in channel 104. AGC loop 204 inherently corrects for hum and residual amplitude modulation. The operation of baud timing recovery loop 212, symbol timing PLL 234, and carrier recovery stages 222 and 238, inherently correct for residual frequency modulation, phase noise, drift, and instability, whether these artifacts are introduced at the transmitter or receiver end. Of course, if these various impairments exceed a given level, the receiver will no longer be able to recover the transmitted data at an acceptable bit error rate (BER).

In general FIGS. 2A and 2C are merely representative of possible digital receiver architectures to which the present invention is applicable. Note that some components of digital receiver 106 are not present in every implementation. For example, some implementations use equalizers that do not require weight updating. Other implementations do not employ any kind of equalizer. Many links do not employ channel coding to improve performance and thus do not require a channel decoding stage.

Overview of Diagnostic System

In accordance with one embodiment of the present invention, impairments are non-invasively measured and otherwise characterized by monitoring and analyzing intermediate data and signals generated internal to a digital receiver. The interpretation and availability of these signals will of course vary depending on the internal architecture of the particular digital receiver employed.

Figure 3:
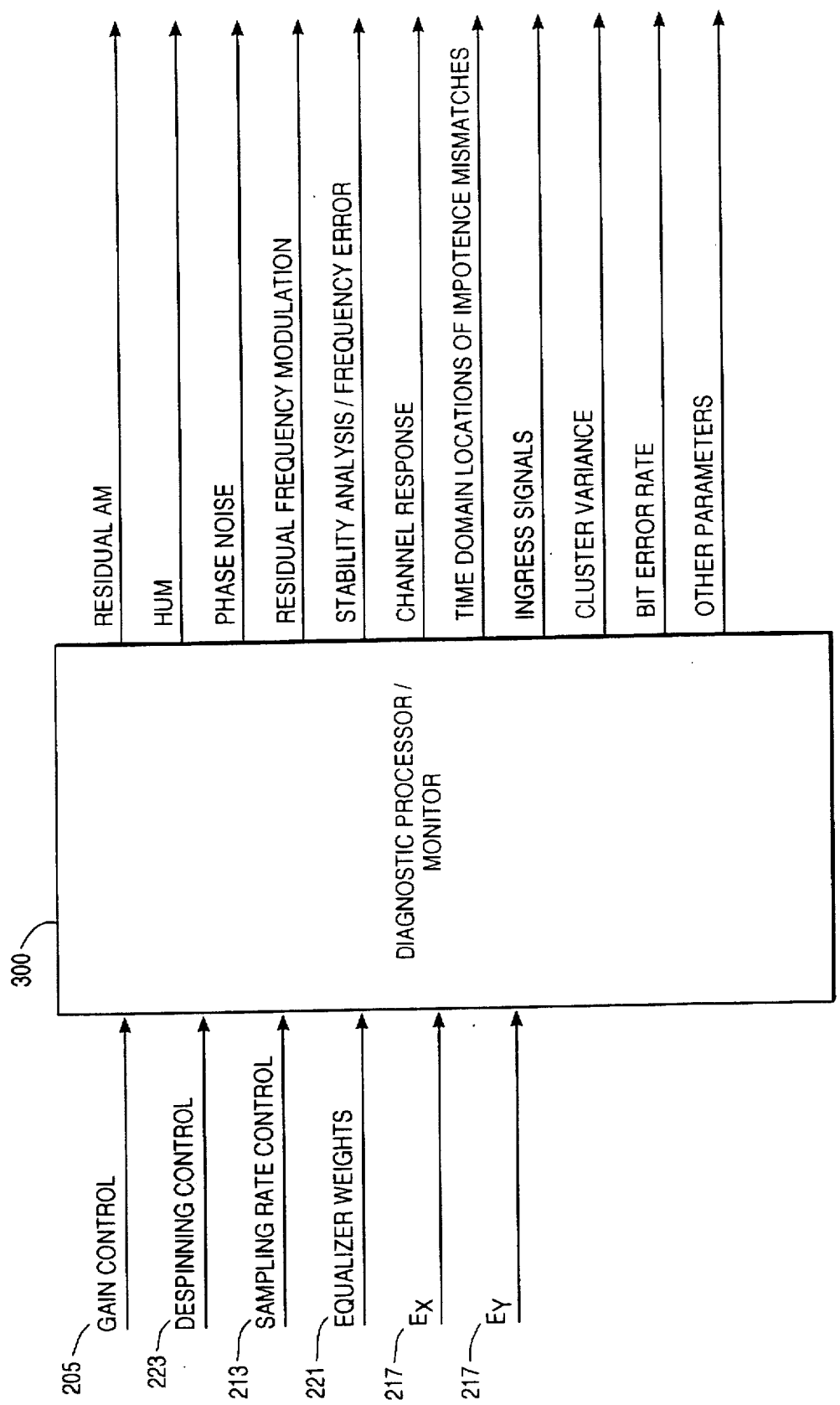
FIG. 3 is a simplified representation of a diagnostic processor/monitor in accordance with one embodiment of the present invention.

FIG. 3 is a simplified representation of a diagnostic processor/monitor 300 in accordance with one embodiment of the present invention. Possible inputs to diagnostic processor/monitor 300 include gain control signal 205 from AGC control circuit 204, a despinning control signal 223 from carrier recovery stage 222, a sampling rate control signal 213 from baud rate recovery loop 212, the current equalizer weights from adaptive equalizer 214, and the error signals and received symbols generated by symbol decision stage 216. The monitor component of diagnostic processor/ monitor 300 receives all these signals and converts them to a form suitable for analysis. The inputs of FIG. 3 are described in reference to the receiver architecture of FIG. 2A but similar inputs could be obtained from the receiver architecture of FIG. 2C.

From gain control signal 205, equalizer weights 221, and error signal 217, diagnostic processor/monitor 300 generates information about residual amplitude modulation and hum. From despinning control signal 223, equalizer weights 221, and error signal 217, diagnostic processor/monitor 300 generates information about phase noise, residual frequency modulation, frequency error, and frequency stability. From sampling rate control signal 213 and equalizer weights 221, diagnostic processor/monitor 300 generates information about transmitter baud timing. Equalizer weights 221 may be used to generate information about the channel response including the time domain locations of impedance mismatches. Error signal 217 generated by symbol decision stage 216 can be used to recover ingress signals and obtain statistical information such as cluster variance, as defined below, and bit error rate.

Figure 4A:
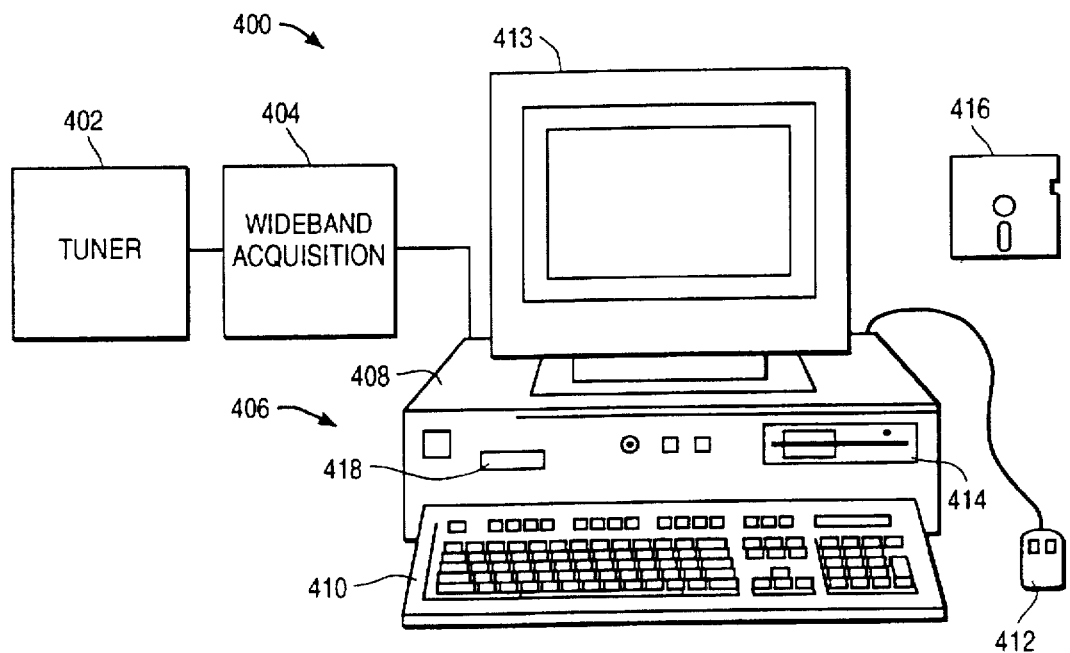
FIG. 4A depicts hardware for implementing a communications link diagnostic system in accordance with a preferred embodiment of the present invention.

FIG. 4A depicts hardware for implementing a communications link diagnostic system 400 in accordance with a preferred embodiment of the present invention. Communications link diagnostic system 400 includes an RF tuner/downconverter 402, a Model 194 Wideband Signal Acquisition and Playback Unit 404 available from the assignee of this application, and a workstation 406. Tuner/downconverter 402 receives a signal from channel 104 and is particularized for the band and transmission medium of interest. Tuner/downconverter 402 selects a signal of interest and downconverts it to a predetermined IF. In the preferred embodiment, the IF is 43.75, MHz.

Wideband Signal Acquisition and Playback Unit 404 emulates the operation of the receiver components depicted in FIG. 2A. The IF signal is digitized at up to 250 MHz and captured in an internal snapshot memory. The remaining functions of the receiver of FIG. 2A are performed by workstation 406.

Workstation 406 includes a processing unit 408 containing control elements. A keyboard 410 and a mouse 412 are coupled to processing unit 408 and enable the system user to input commands and data to workstation 406. A display device 413 is provided for displaying test results. Workstation 406 further includes a floppy disk drive 414 adapted to receive a floppy disk 416, and an internal hard drive 418.

Figure 4B:
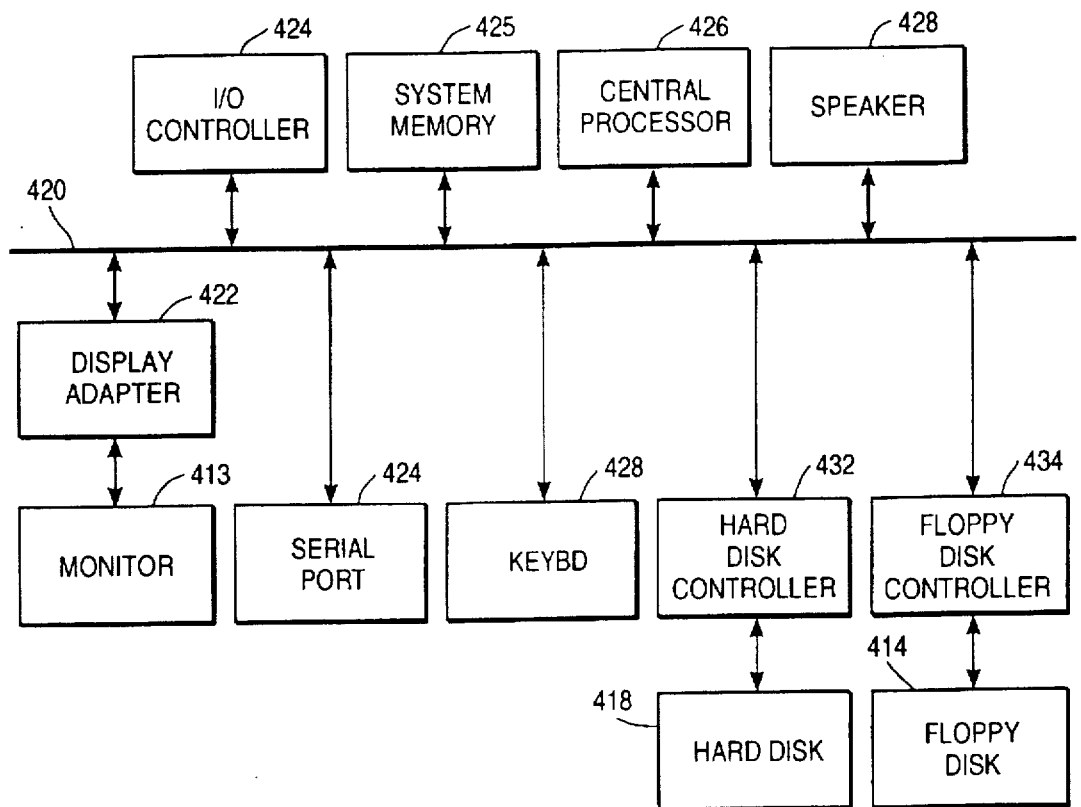
FIG. 4B depicts a system architecture block diagram of a workstation.

FIG. 4B depicts a system architecture block diagram of workstation 406 of FIG. 4A. The system elements are interconnected by a system bus 420 and include a display adapter 422 coupled to display device 413, an I/O controller 424, system memory 425, a central processor (CPU) 426, a speaker 428, a serial port 429, keyboard 410, a hard disk controller 432 coupled to hard disk drive 418, and a floppy disk controller 434 coupled to floppy disk drive 434. CPU 426 controls operation of workstation 406. Program and data information are stored in system memory 424, on floppy disk 416, and on hard disk drive 418.

Analysis software stored in system memory 424, on floppy disk 416, and/or on hard disk drive 418 implements the functionality of diagnostic processor/monitor 300 as well as the functionality of digital receiver 106. Of course any tangible medium including CD-ROM, magnetic tape, flash memory etc. could store this software.

The workstation of FIGS. 4A-4B is merely representative of hardware usable to implement the present invention. In an alternative embodiment, the present invention is implemented as a battery-operated portable system suitable for field work.

In the embodiment shown in FIGS. 4A-4B, Wideband Signal Acquisition and Playback Unit 404 captures sufficient signal information for a full analysis in less than one second. The analysis itself completes in 1-2 minutes. An optional coprocessor card installable within workstation 406 can reduce analysis time to approximately 10 seconds.

In a preferred embodiment, workstation 406 derives and displays on display device 408 combinations of the following: (1) transmission (or propagation) channel response; (2) carrier-to-noise ratio (CNR); (3) spectrum of the underlying noise and any interference signals; (4) phase noise estimates; (5) signal spectrum, signal polar plot, signal constellation and eye diagram (for analyzing intersymbol interference) and (6) other diagnostic displays.

Analysis of Channel Response

In accordance with one embodiment of the present invention, the response of channel 104 or a portion of channel 104 may be determined. From the channel response, the operator can determine undesirable multipath, cable, or waveguide mismatching. When channel 104 is the ambient atmosphere, structures such as buildings, vehicles, aircraft, hills, etc., can reflect the transmitted signal such that the transmitted signal is subject to multipath. If channel 104 is a coaxial distribution system, reflections may be caused by impedance mismatches resulting from loose connectors, etc. Receiver 106 receives multiple versions of the transmitted signal at slightly different times due to the differences between the path lengths of the reflected signals and the path length of the transmitted signal. Discovering such reflections is an important aspect of diagnosing a link.

The channel response analysis technique of the present invention will be made clearer by a simplified mathematical characterization of digital communications system 100. The notation used herein follows a standard linear time-invariant model. The conversion of the results to slowly time-varying or somewhat non-linear systems is well-known in the art.

Referring again to FIG. 1, transmitter 102 and associated electronics shape and transmits an input symbol stream $S_n$. Channel 104 carries the output pulses corresponding to the symbol stream, modifying the pulses according to the response of the channel. Referring to FIG. 2A, the components of receiver 106 to the left of adaptive equalizer 214 introduce a further response component. The combined response of transmitter 102, channel 104, and components of receiver 106 to the left of adaptive equalizer 214 can be denoted as H, while the response of adaptive equalizer 214 can be denoted as W. The overall response of the system up to the output of adaptive equalizer 214 can then be written as $$W H S_n = \hat{S}_n + \epsilon, \tag{1}$$

where $\hat{S}_n + \epsilon$ is the output of the equalizer structure and is a noisy estimate of the original symbol stream $S_n$.

When communications system 100 is working effectively, $\hat{S}_n$ is a very good estimate of $S_n$, i.e., the received symbols are very close to the same symbols transmitted. In this case, W operating on H as a matrix operator is very close to the identity, I, a matrix operator being defined as an operator which takes one or more vectors, matrices, or tensors as arguments and returns a vector, matrix, or tensor. Thus, the following relationships hold:

$$S_n = \hat{S}_n \tag{2}$$

$$W H S_n = \hat{S}_n \rightarrow W H = I. \tag{3}$$

It then follows that the pseudoinverse of W, $W^\#$, is very close to H, the overall system response. One can estimate H as:

$$\hat{H} = W^\#. \tag{4}$$

Figure 5A:
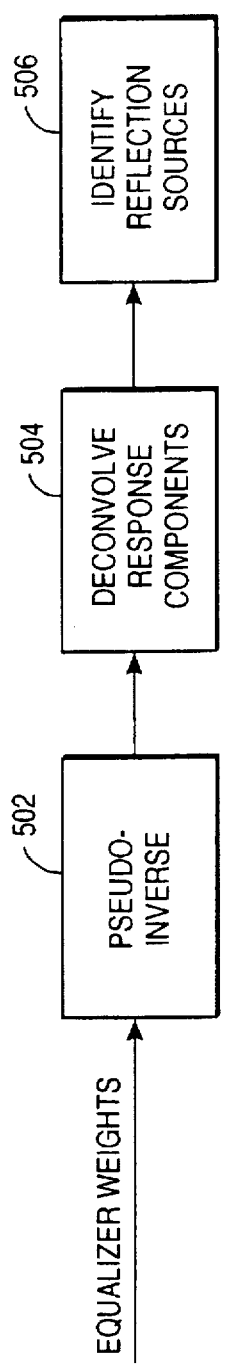
FIG. 5A is a flowchart describing the steps of analyzing a channel response in accordance with one embodiment of the present invention.

FIG. 5A is a flowchart describing the steps of analyzing a channel response in accordance with one embodiment of the present invention. At step 502, the pseudoinverse of the equalizer response is determined using the weights generated by weight updating stage 220.

In one embodiment, the pseudoinverse is computed at step 502 explicitly, using Singular Value Decomposition as is well known to those of skill in the art. Any of a variety of well-known matrix algebraic methodologies could be used.

Figure 5B:
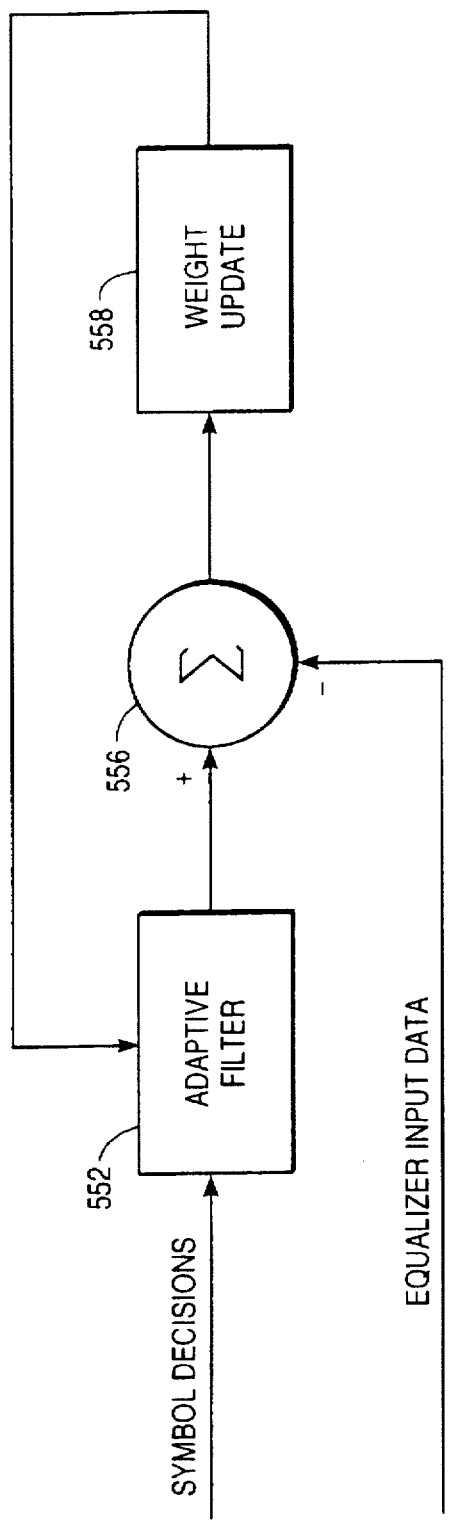
FIG. 5B shows a system for implicitly calculating the pseudo-inverse of an equalizer response in accordance with one embodiment of the present invention.

FIG. 5B shows a system 550 for implicitly calculating the pseudoinverse at step 502. An adaptive filter 552 (distinct from adaptive equalizer 214) receives an ideal modulation signal representing the symbol decisions generated by symbol decision stage 216. The output of adaptive filter 552 is subtracted from the input data to adaptive equalizer 214 within a summer 556. A weight updating stage 558 then operates to modify the tap weights of adaptive filter 552 to minimize the output of summer 556, preferably using the well-known least mean square (LMS) procedure. Since the filter taps have converged, i.e., adapted to a solution such that the error cannot be further minimized and the error is acceptably small enough, the response of adaptive filter 552 matches the overall system response. It has been found that the channel can be modeled with residual errors 35–40 dB below the level of the channel response.

Once a pseudoinverse is computed as an estimate of the overall system response H, particular components of the system response may be isolated, at step 504. For many communications systems, the response of the transmitter 102, the pre-equalizer components of receiver 106, or both are well known. In these cases, the known responses can be deconvolved from Ĥ, leaving an estimate of the channel response alone.

Furthermore, there may also be known portions of the response of channel 104 that may be deconvolved to focus on a particular portion of interest. For example, it may be desirable to analyze only the portion of a coaxial cable system lying within a subscriber's home. Once a desired response is obtained, it may be shown on display device 508.

In accordance with the invention, an all-pass portion of the response of a channel component of interest may be isolated at step 506 to identify the locations of reflections. The time domain representation of the all-pass component will show the locations of individual reflections which could be caused by e.g., loose connectors. In accordance with the invention, the allpass portion of the response may be obtained without exact knowledge of the frequency-dependent amplitude response by using homomorphic signal processing or parametric signal processing.

Homomorphic signal processing is a method by which a signal is decomposed into an all-pass component and a minimum-phase component. This decomposition can be performed using techniques well known to those skilled in the art, including methods described in [Oppenheim89] and [IEEE79], the contents of which are herein expressly incorporated by reference for all purposes. In the case where the input signal consists of a signal corrupted by micro-reflections, the minimum-phase portion of the signal will contain a representation of the spectrum of the direct arrival of the desired signal, while the all-pass portion will contain a representation of the impulse response of the channel's micro-reflections.

In cases where the ideal (uncorrupted) channel response is known, or can be reasonably estimated, parametric signal processing techniques may be employed to better estimate the corrupted channel response. In using parametric approaches, a model for the corrupted channel response is hypothesized. This model includes several unknown parameters, such as time-of-arrival and amplitude of micro-reflections. The values for each of these parameters may then be determined in any number of methods well known to those skilled in the art, including Maximum Likelihood, Maximum Entropy, Minimum Variance, etc. Details of these methods, as known to those of skill in the art, may be found throughout the literature, including [VanTrees68], [Haykin83], [Haykin85], [Haykin91], and [Marple87], all the contents of these references being herein expressly incorporated by reference for all purposes.

Thus, the locations of individual reflections may be obtained without resort to invasive probing of the system while it is operating. This is an important advantage over prior art time domain reflectometry techniques which require that normal operation be interrupted.

The resolution of the above-described system in locating reflection sources is limited by the effective temporal resolution of the equalizer. For a simple finite impulse response (FIR) structure, the effective temporal resolution is directly related to the tap spacing. If standard processing approaches are utilized, a typical T- or T/2-spaced equalizer is limited to a resolution of T or T/2, respectively, where T is equal to the symbol period. For typical digital cable television (CATV) applications, a 5 MBaud, T/2-spaced equalizer would have a temporal resolution of 100 ns. This translates to a resolution of about 24 meters (m) in typical coaxial cable.

In accordance with one embodiment of the invention, by employing a non-integer, fractionally-spaced equalizer, the temporal resolution can be increased by interpreting the equalizer as a polyphase structure. In such systems, the sample rate is approximately equal to $(2*N*K/L)$ times the symbol rate where $2*L>K>L$, and K, L, and N are integers. In the case of a T/1.2-spaced equalizer, as is described in the Harp et al. application, the resulting temporal resolution is T/6. For a 5 MBaud system, this would provide a 33 ns resolution, better than 8 m in the same coaxial cable where only 24 m was the resolution available using a T/2-spaced equalizer. Other spacings can provide even better resolution than that of a T/1.2 equalizer, though usually at the expense of greater computational complexity.

With a T/1.2-spaced equalizer, one can visualize the structure as a linear, time-varying system comprised of five distinct equalizer phases. Each of these phases is used in turn as each new sample is received. Without loss of generality, the first of these phases (Phase 0) is assigned a relative delay of 0 and is responsible for providing an output corresponding to some symbol sent at t=0. The next phase (Phase 1) of the equalizer is then responsible for predicting the symbol sent at t=T, but using samples collected with a relative delay of 5T/6. Thus the taps of Phase 1 are effectively T/6 (T−5T/6) advanced relative to those in Phase 0.Similarly, the remaining phases are advanced by T/6 from the previous phase. This relationship may be summarized as in Table 1:

TABLE 1

| Tap Phase | Relative Delay/T | | | | | | | | |
|---|---|---|---|---|---|---|---|---|---|
| | 0 | 1 | 2 | 3 | 4 | 5 | 6 | 7 | ... |
| 0 | 0/6 | 5/6 | 10/6 | 15/6 | 20/6 | 25/6 | 30/6 | 35/6 | ... |
| 1 | −1/6 | 4/6 | 9/6 | 14/6 | 19/6 | 24/6 | 29/6 | 34/6 | ... |
| 2 | −2/6 | 3/6 | 8/6 | 13/6 | 18/6 | 23/6 | 28/6 | 33/6 | ... |
| 3 | −3/6 | 2/6 | 7/6 | 12/6 | 17/6 | 22/6 | 27/6 | 32/6 | ... |
| 4 | −4/6 | 1/6 | 6/6 | 11/6 | 16/6 | 21/6 | 26/6 | 31/6 | ... |

As shown in this table, the relative delay decreases by T/6 from phase to phase, and increases by 5T/6 from tap to tap. As can also be seen from this table, by properly ordering the N taps of the entire equalizer structure, all relative delays from −4T/6 up through (N−5) T/6 in increments of T/6 are available. This defines the response of the equalizer with a resolution of T/6 (<0.17 T), three times better than that obtainable with T/2 equalizers and their inherent 0.5 T resolution.

Analysis of Error Signal

In accordance with the invention, diagnostic processor/monitor 300 receives error signal 217 corresponding to the difference between an ideal modulation signal representing the output estimates and the input of symbol decision stage 216. For systems that employ channel coding, an alternative way to generate the error signal is to reencode the decoded output of channel decoding stage 218 and form an ideal modulation signal representing this corrected encoded data. The error signal is then the difference between this encoded data and the input of symbol decision stage 216.

FIG. 6A is a block diagram describing various modes of taking advantage of error signal 217 which represents ingress interference in communications channel 104. One possibility is direct display of the error signal in the time domain. An operator able to view this display may be able to recognize the source of ingress error as for example, 60 Hz line noise. Burst errors or other time varying phenomena may be identified. Alternatively, it may be useful to convert the signal into the frequency domain (block 602) using well-known techniques prior to display. This provides the equivalent of a spectrum analyzer on an unoccupied channel. A frequency domain display may show the presence of ingress interference from an AM or FM broadcast signal, for example.

Alternatively, statistics of error signal 217 may be computed (block 604) in relation to the symbol stream output from symbol decision stage 216 to develop indicia of link quality. One extremely useful measure of quality is the "cluster variance" (CV). The cluster variance is the ratio of the variance of the power in the error signal to the power in the symbol stream. With its close relationship to the signal-to-noise ratio (SNR) of the digital carrier (equality in the case of a matched equalizer and only additive Gaussian noise), the bit error rate (BER) can be estimated from theoretical performance curves without the use of any additional error detection or error correction circuitry.

Figure 6B:
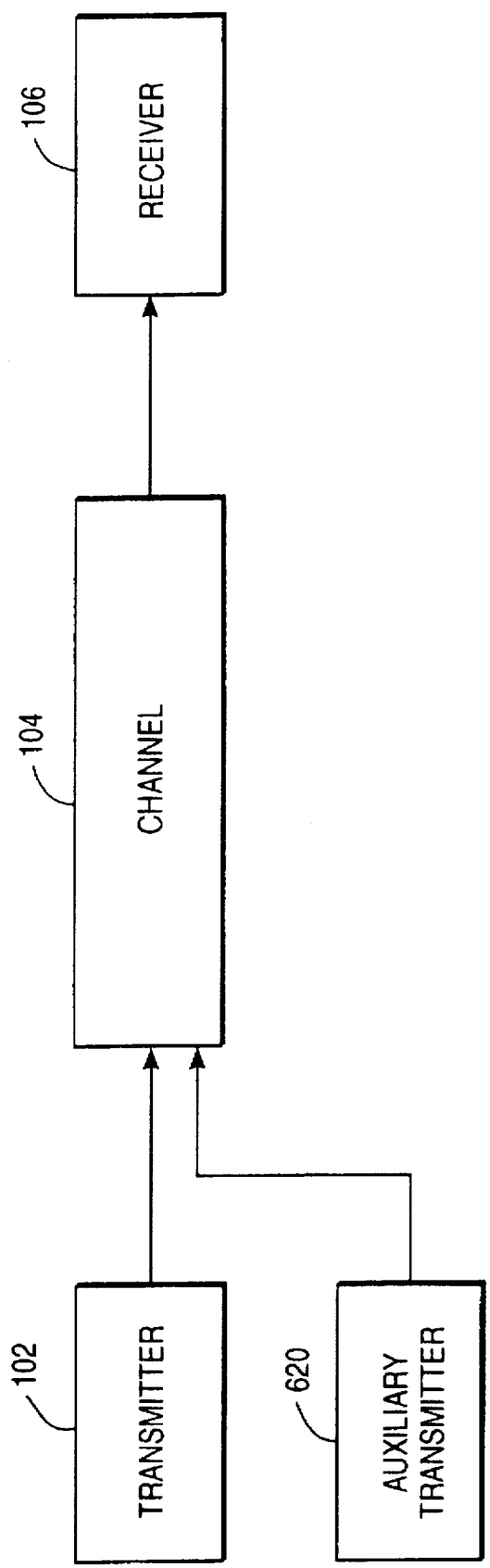
FIG. 6B depicts a communications channel with an additional ingress signal being injected by a second digital transmitter.

Demodulation of the error signal (block 606) may also be useful. Converting the demodulated signal to audio may allow ready identification of broadcast interference. Alternatively, the demodulated error signal may be used to recover one or more deliberately injected in-band ingress carriers. If the level of these carriers is sufficiently low (e.g., −27 dBc for 64-QAM), the digital carrier is not appreciably disturbed. FIG. 6B depicts communications channel 104 with an additional ingress signal being injected by a second digital transmitter 620.

Evaluation of System Margin

Figure 7A:
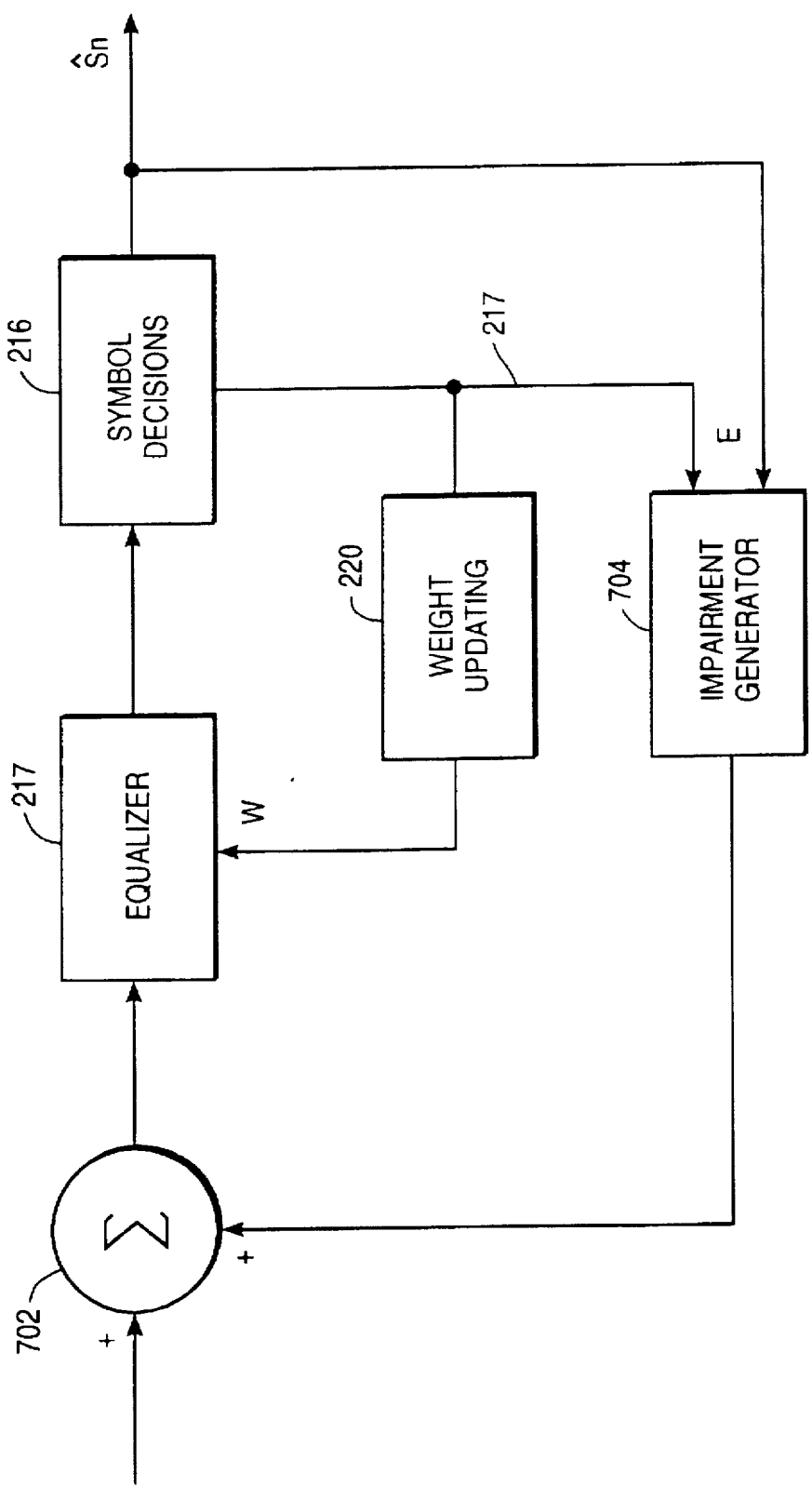
FIGS. 7A-7B are diagrams illustrating how system margin may be tested non-invasively in accordance with one embodiment of the present invention.
Figure 7B:
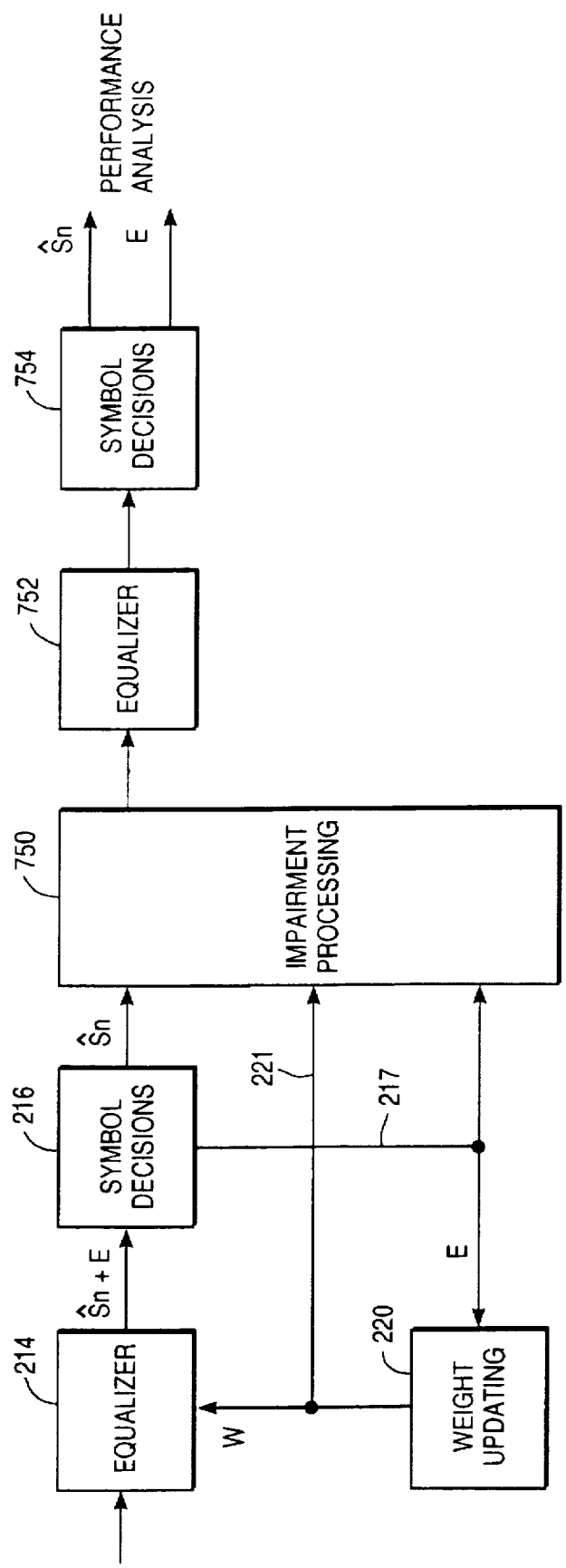

FIGS. 7A–7B are diagrams illustrating how system margin may be tested non-invasively in accordance with one embodiment of the present invention. FIG. 7A depicts one approach to testing system margin. A summer 702 is inserted prior to adaptive equalizer 214 to add in an impairment signal. The output of symbol decision stage 216 can then be analyzed to measure the deterioration in performance that results from the impairment signal in the manner described in connection to FIG. 6A.

An impairment generator 704 generates the impairment from error signal 217 generated by symbol decision stage 216. One approach is simply to amplify error signal 217 which represents the existing interferers within impairment generator 704 until the bit error rate becomes unsatisfactory. The degree of amplification necessary to produce this level of signal quality degradation then represents how much more of the current interference can be tolerated. Alternatively, filtering could be applied within impairment generator 704 to isolate a particular type of interference to be re-applied to the signal and determine how much more of this interference could be tolerated. Another alternative is to apply additive noise through summer 702 and determine how much noise is necessary to disrupt communication. One or more reflections may be simulated by using impairment generator 704 to delay a reconstruction of the transmitted signal based on the symbol estimates. Also, if desired, only a particular spectral portion of the reconstruction may be delayed in this way.

FIG. 7B depicts an alternative approach to estimating system margin. An impairment processor 750 may apply various form of signal impairment to a reconstruction of the transmitted signal based on the output of symbol decision stage 216. If forward error correction is being used, impairment processor 750 may instead use the corrected data as input and re-apply the relevant code prior to further processing. Impairment processor 750 may apply additive impairments as in FIG. 7A or may apply a simulated channel response. The output of impairment processor 750 is applied to an equalizer 752 similar to equalizer 214. (The updating of the weights of equalizer 752 is not shown.) Equalizer 752 thus seeks to correct for the impairments introduced by impairment processor 750. A symbol decision stage 754 then makes symbol decisions based on the output of equalizer 752. Together equalizer 752 and symbol decision stage 754 constitute an auxiliary demodulator. The effects of the impairments introduced by impairment processor 750 are analyzed based on error and symbol estimate outputs of symbol decision stage 754 as described in reference to FIG. 6A.

Impairment processor 750 may apply additive interference based on error signal 217 in a manner similar to that discussed in reference to FIG. 7A. As the interference level is varied, the error and symbol estimate outputs of symbol decision stage 754 may be monitored for unacceptable performance deterioration.

Impairment processor 750 may also apply a digital filter that simulates an intensification of an existing distortion. Impairment processor 750 may determine the existing distortion by taking the pseudoinverse of the weights 221 applied by weight updating stage 220. If a particular distortion, e.g., a reflection is to be applied, it may be isolated by use of simple deconvolution, homomorphic signal processing, or parametric signal processing as was discussed with reference to FIG. 5A. Varying the intensity level of the simulated reflection or reflections while monitoring the outputs of symbol decision stage 754 helps determine how much more impairment can be tolerated without disrupting communications.

Analysis of Receiver Loop Parameters

Figure 8A:
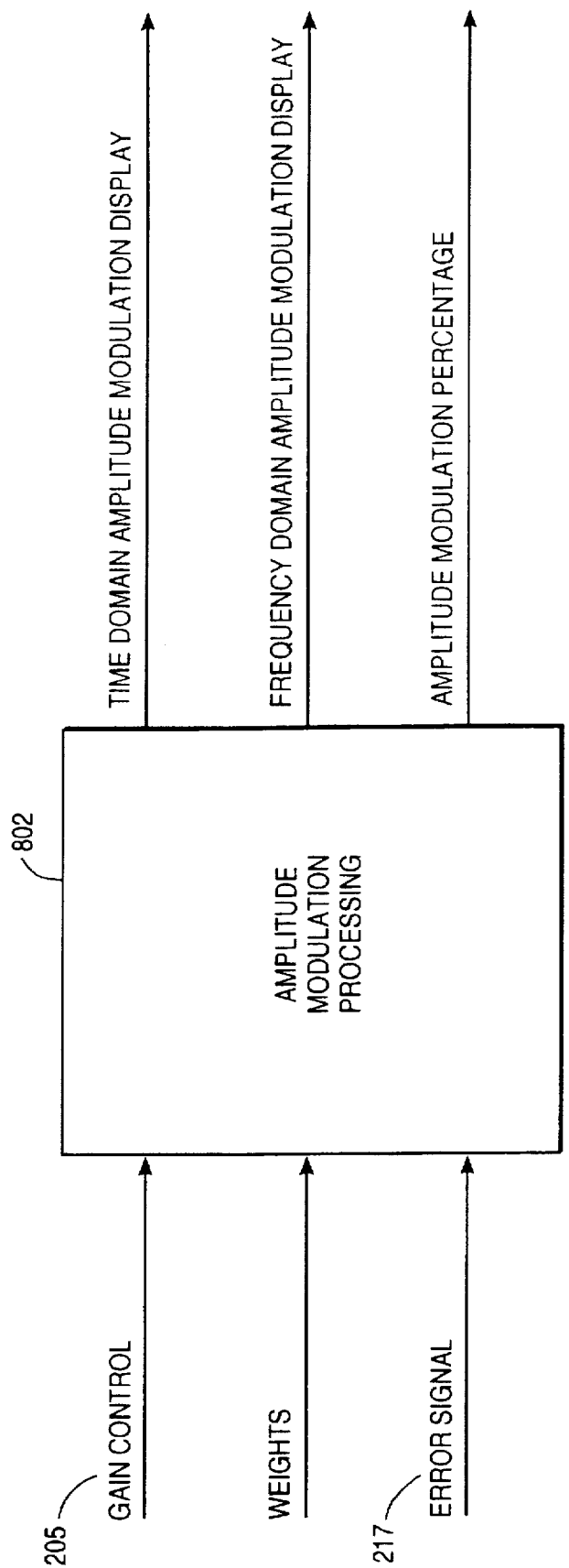
FIGS. 8A-8C are diagrams illustrating how parameters relating to residual modulation and symbol timing variation may be measured in accordance with the invention.
Figure 8B:
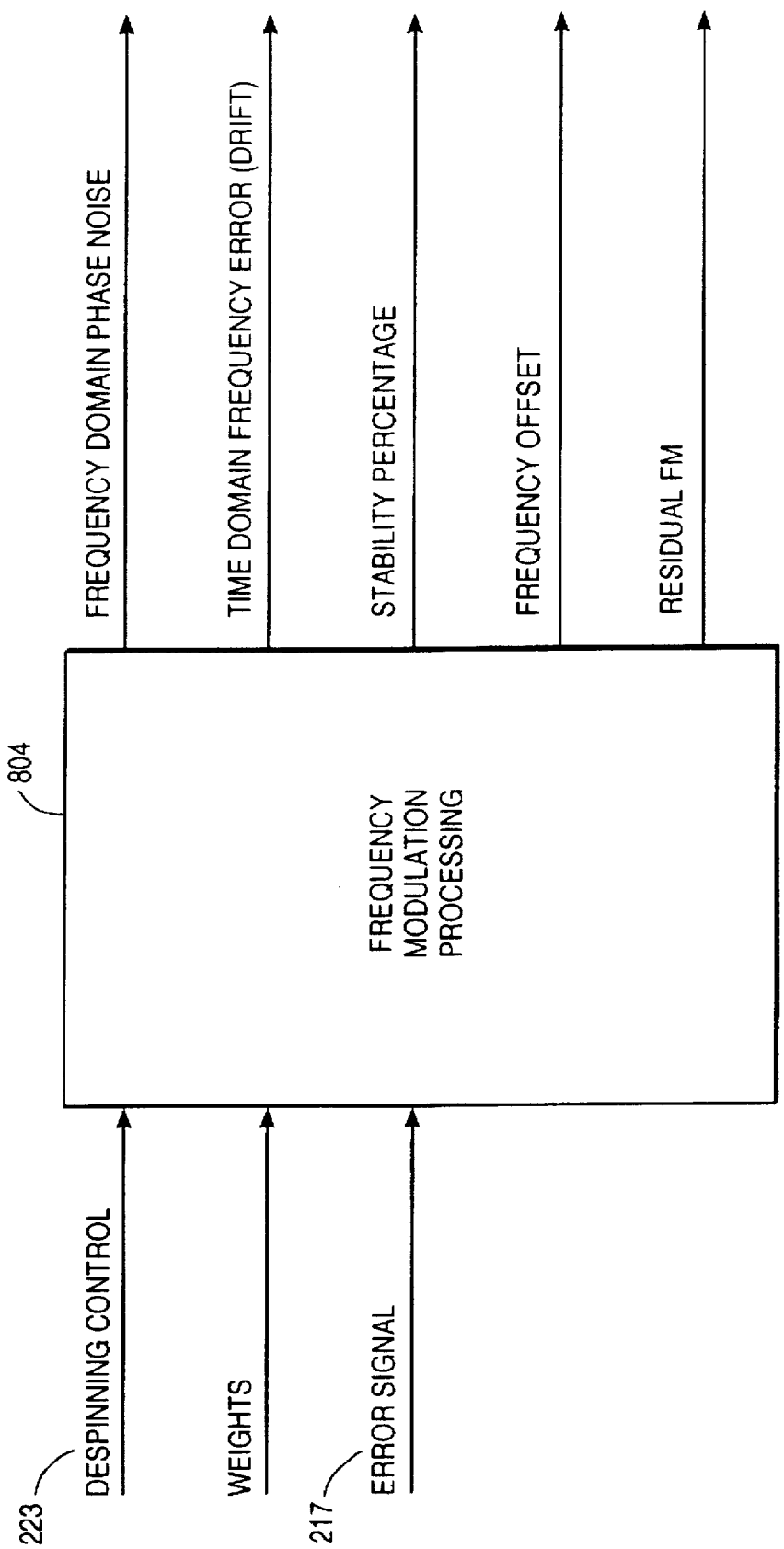
Figure 8C:
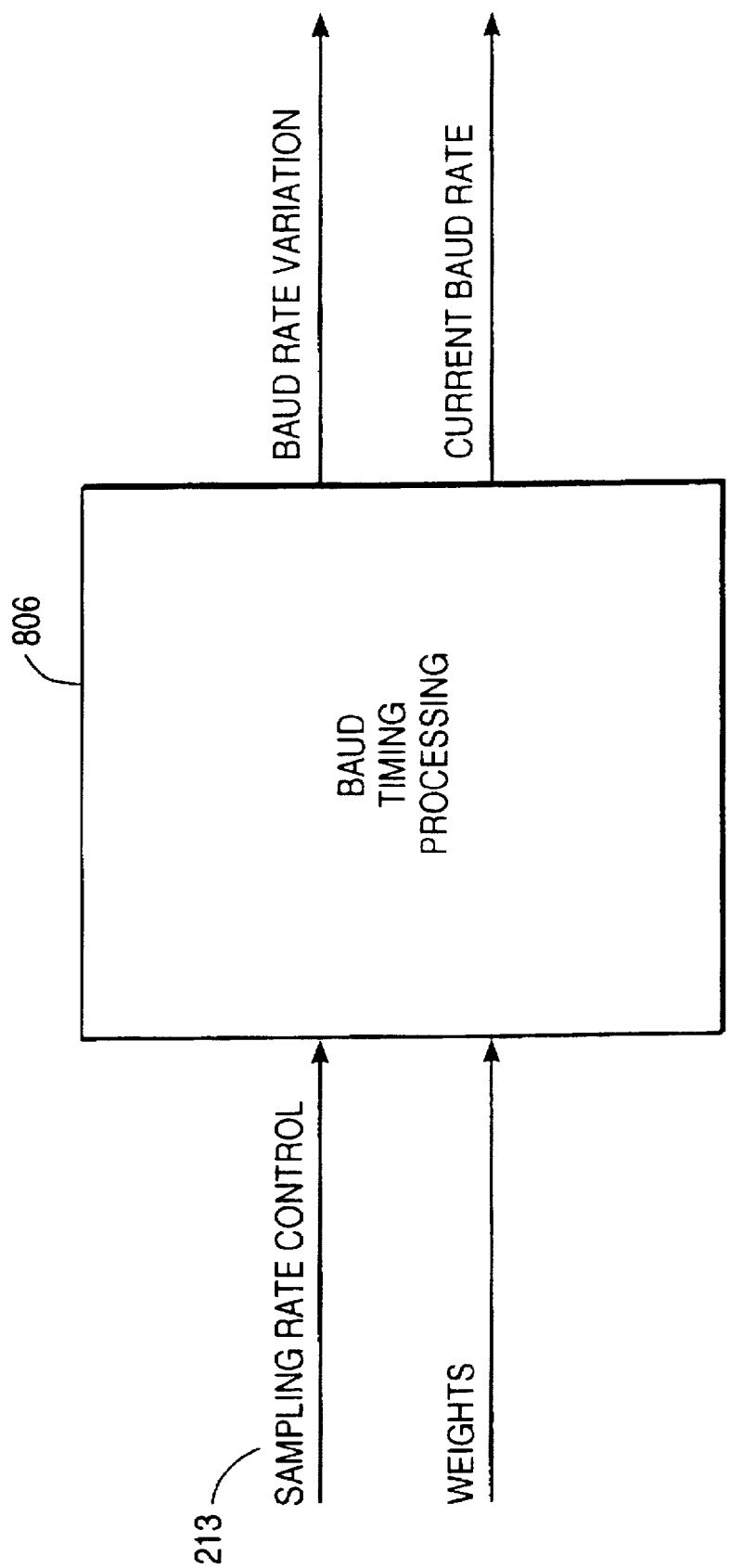

FIGS. 8A–8C are diagrams illustrating how parameters relating to residual modulation and symbol timing variation may be measured in accordance with the invention. FIG. 8A depicts how parameters relating to residual amplitude modulation may be measured and displayed in accordance with one embodiment of the present invention. Residual amplitude modulation may be caused by either transmitter or receiver components. Referring to receiver 106, residual amplitude modulation will make itself apparent in several ways. One way is variation in gain control signal 205 which will adjust so as to remove residual amplitude modulation within its loop bandwidth. The variation in the overall gain of equalizer 214 as controlled by weight update stage 220 will operate to remove amplitude variations seen within adaptive equalizer 214. Amplitude modulation that is not removed by the operation of AGC stage 204 and adaptive equalizer 214 will appear as a radial component in error signal 217 generated by symbol decision stage 216.

In order to generate information about amplitude modulation, an amplitude modulation processing stage 802 receives gain control signal 205, the weights generated by weight updated stage 220 and error signal 217 generated by symbol decision stage 216. Prior to further processing, gain control signal 205 is filtered to remove the known dynamics of the gain control loop. The received weights are processed to isolate the time varying portion of the overall gain of equalizer 214. The cutoff frequency of this isolated gain response is determined responsive to the loop bandwidth of the AGC loop formed by gain stage 202 and automatic gain control stage 204. Two-dimensional error signal 217 is processed to isolate a radial component. Amplitude modulation stage 802 then determines, in the time domain, a weighted sum of gain control signal 205, the time varying portion of the gain of equalizer 214, and radial component of error signal 217 to obtain a time domain representation of the residual amplitude modulation of the received signal input to gain stage 202. One of skill in the art will understand how to adjust the weights appropriate to the parameters of adaptive equalizer 214 and symbol decision stage 216.

Once a time domain representation of the residual amplitude modulation is generated, it may be displayed directly. Alternatively, it may be converted to the frequency domain using well known techniques prior to display as an amplitude modulation spectrum. This type of display is highly useful in isolating, e.g., hum caused by poor isolation between power line noise and transmitter or receiver components. Another useful parameter that may be displayed numerically is the percentage of amplitude modulation which is defined as the amplitude of the time domain amplitude modulation signal divided by the overall received signal amplitude, which is a fixed parameter of the receiver.

FIG. 8B depicts how parameters relating to frequency and/or phase modulation may be determined in accordance with one embodiment of the present invention. Referring again to receiver 106, residual frequency and/or phase modulation will show up in despinning control signal 223 as it seeks to correct for the angular component of error signal 217. Equalizer 214 will also seek to correct for residual frequency and/or phase modulation and variation through variation in the phase component of the weights generated by equalizer weight update stage 220. However, the remaining uncompensated angular component of error signal 217 will also represent a component of frequency and/or phase modulation.

In accordance with one embodiment of the present invention, a frequency modulation processing stage 804 receives despinning control signal 223, the weights generated by weight update stage 220, and error signal 217. Prior to further processing, despinning control signal is filtered to remove the known characteristics of the carrier recovery loop. Frequency modulation processing stage 804 isolates the time varying phase component of the weights and the angular component of error signal 217 and generates a weighted sum of these components with despinning control signal 223. The weighted sum serves as a time domain representation of instantaneous phase error.

This phase error signal can be displayed directly in the time domain, enabling the operator to recognize periodicity or other patterns. The preferred embodiment also has the capability of converting the phase error signal to the frequency domain. The carrier signal, whose amplitude and frequency are fixed receiver parameters, can be superimposed over a frequency domain display of the phase error to provide convenient read out of phase noise level in dBc/Hz (decibels below carrier per Hertz). The phase error signal can also be differentiated to provide a time domain display of frequency error relative to expected carrier frequency. Low frequency variations in frequency error represent drift of carrier frequency. A stability percentage over a given time may also be computed and displayed. An average frequency error can also be displayed numerically as a fixed offset indicating, e.g., transmitter component variation. Note that some receiver architectures do not downconvert received signals all the way to DC. In these architectures, downconverted frequency offset should be removed prior to display of frequency error. A frequency domain representation of the differentiated phase error signal will help show sources of residual FM.

FIG. 8C depicts how baud rate and baud rate variation may be analyzed and displayed in accordance with one embodiment of the present invention. Variations in baud time will appear within receiver 106 via sampling rate control signal 213 which operates to synchronize sampling and via the variation in delay through equalizer 214. A baud timing processing stage 806 receives sampling rate control signal 213 and the weights generated by equalizer weight update stage 220. Prior to further processing, baud timing processing stage 806 filters sampling rate control signal 213 to remove the known dynamics of the baud timing recovery loop. Baud timing processing stage 806 isolates the time varying delay component of the response of equalizer 214 as represented by the weights and obtains a weighted sum of sampling rate control signal 213 and the time domain representation of the isolated delay component to form a timing signal. The so-obtained timing display may be displayed numerically as the current baud rate or graphically to show variation in baud rate over time. Baud rate variations would be caused by errors or problems in the transmitter. A baud rate stability percentage over a given time may also be displayed.

Of course, in receiver architectures that do not include an adaptive equalizer, estimates of the above-described modulation and timing parameters could be obtained from the various control loop parameters alone. Equalizer weights and error signals would not be considered.

In a preferred embodiment, the invention is sufficiently modular and programmable to allow customization of the demodulator, system parameters, modulation types, displays and diagnostics to meet specific system requirements.

In another preferred embodiment, the invention is powered by a battery, increasing the portability of the system.

Variations on the methods and apparatus disclosed above will be readily apparent to those of ordinary skill in the art. Accordingly, particulars disclosed above are intended not as limitations of the invention.

Bibliography

[Haykin83] S. S. Haykin, *Non-Linear Methods of Spectral Analysis*, (Springer-Verlag 1983).

[Haykin85] S. S. Haykin, *Array Signal Processing*, (Prentice-Hall 1985).

[Haykin91] S. S. Haykin, *Advances in Spectrum Analysis and Array Processing*, (Prentice-Hall 1991).

[IEEE79] *Programs for Digital Signal Processing*, Edited by the Digital Signal Processing Committee, IEEE Acoustics, Speech, and Signal Processing Society, (IEEE Press 1979).

[Marple87] S. L. Marple, *Digital Spectral Analysis*, (Prentice-Hall 1987).

[Oppenheim89] A. V. Oppenheim & R. W. Schafer, *Discrete-Time Signal Processing*, (Prentice-Hall 1989).

[VanTrees68] H. L. Van Trees, *Detection, Estimation, and Linear Modulation Theory*, (John Wiley & Sons 1978).

What is claimed is:

1. In a digital communications system comprising:

a digital transmitter that converts digital data to be transmitted to a stream of symbols, and modulates a carrier signal responsive to said stream of symbols to produce a modulated carrier signal, a communications channel coupled to said digital transmitter, that distributes the modulated carrier signal, said communications channel having an associated channel response that distorts said modulated carrier signal to produce a distorted modulated carrier signal, a demodulator that receives the distorted modulated carrier signal and extracts an estimated modulation signal, a symbol decoder that translates a representation of said estimated modulation signal output into estimates of said digital data, a method for identifying error ingress sources in said communications channel comprising the steps of:

generating an ideal modulation signal representing said digital data;

generating a difference signal between said ideal modulation signal and said estimated modulation signal as an estimate of an interfering signal;

receiving said difference signal into a diagnostic processor; and intentionally injecting an ingress signal carrying additional information into the communications channel, said difference signal being a representation of said intentionally injected ingress signal.

2. In a digital communication system comprising:

a first digital transmitter that converts a first stream of digital data to be transmitted to a stream of symbols, and modulates a first carrier signal responsive to said stream of symbols to produce a first modulated carrier signal, a communications channel coupled to said first digital transmitter, that distributes said first modulated carrier signal, said communications channel having an associated channel response that distorts said first modulated carrier signal to produce a distorted first modulated carrier signal, a demodulator that receives the distorted modulated carrier signal and extracts an estimated modulation signal, a symbol decoder that translates a representation of said estimated modulation signal output into estimates of said first stream of digital data, a method of transmitting a second modulated carrier signal through said communications channel comprising the steps of:

using a second digital transmitter coupled to said communications channel to generate said second modulated carrier signal and transmit said second modulated carrier signal, said second modulated carrier signal overlapping the first modulated carrier signal in the frequency domain;

generating a difference signal between an ideal modulated signal representing said estimates of said first stream of digital data and said estimated modulation signal as an estimate of an error signal; and monitoring said error signal to obtain said second modulated carrier signal.

3. The method of claim 2 wherein said first digital transmitter comprises a channel coder that applies channel coding to said first stream of digital data prior to transmission, said symbol decoder comprises a channel decoder that removes said channel decoding from said estimates of said first stream of digital data, and said generating step comprises the substep of:

applying said channel coding to said estimates of said first stream of digital data to develop said ideal modulated signal.

4. In a digital communications system comprising:

a digital transmitter that converts digital data to be transmitted to a stream of symbols, and modulates a carrier signal responsive to said stream of symbols to produce a modulated carrier signal, a communications channel coupled to said digital transmitter, that distributes the modulated carrier signal, said communications channel having an associated channel response that distorts said modulated carrier signal to produce a distorted modulated carrier signal, a demodulator that receives the distorted modulated carrier signal and extracts an estimated modulation signal, a symbol decoder that translates a representation of said estimated modulation signal output into estimates of said digital data, apparatus for identifying error ingress sources in said communications channel comprising:

means for generating an ideal modulation signal representing said digital data;

means for generating a difference signal between said ideal modulation signal and said estimated modulation signal as an estimate of an interfering signal; and receiving said difference signal into a diagnostic processor means for intentionally injecting an ingress signal carrying additional information into the communications channel, said difference signal being a representation of said intentionally injected ingress signal.

5. In a digital communication system comprising:

a first digital transmitter that converts a first stream of digital data to be transmitted to a stream of symbols, and modulates a first carrier signal responsive to said stream of symbols to produce a first modulated carrier signal, a communications channel coupled to said first digital transmitter, that distributes said first modulated carrier signal, said communications channel having an associated channel response that distorts said first modulated carrier signal to produce a distorted first modulated carrier signal, a demodulator that receives the distorted modulated carrier signal and extracts an estimated modulation signal, a symbol decoder that translates a representation of said estimated modulation signal output into estimates of said first stream of digital data, apparatus for transmitting a second modulated carrier signal through said communications channel comprising:

means for using a second digital transmitter coupled to said communications channel to generate said second modulated carrier signal and transmit said second modulated carrier signal, said second modulated carrier signal overlapping the first modulated carrier signal in the frequency domain;

means for generating a difference signal between an ideal modulated signal representing said estimates of said first stream of digital data and said estimated modulation signal as an estimate of an error signal; and means for monitoring said error signal to obtain said second modulated carrier signal.

6. The apparatus of claim 5 wherein said first digital transmitter comprises a channel coder that applies channel coding to said first stream of digital data prior to transmission, said symbol decoder comprises a channel decoder that removes said channel decoding from said estimates of said first stream of digital data, and said generating means comprises the substep of:

means for applying said channel coding to said estimates of said first stream of digital data to develop said ideal modulated signal.

7. In a digital receiver system comprising:

a demodulator that receives a distorted modulated carrier signal carrying digital data and extracts an estimated modulation signal, a symbol decoder that translates a representation of said estimated modulation signal output into estimates of said digital data, a method of diagnosing a communication channel to which said distorted modulated carrier signal was subject, said method comprising the steps of:

generating an ideal modulation signal representing said digital data;

generating a difference signal between said ideal modulation signal and said estimated modulation signal as an estimate of an interfering signal, said difference signal being resolved into orthogonal components;

receiving said difference signal into a diagnostic processor; and calculating statistics of said difference signal using said orthogonal components using said diagnostic processor.

8. The method of claim 7 wherein said calculating step comprises calculating a power of said difference signal.

9. The method of claim 7 wherein said calculating step comprises estimating a bit error rate of said distorted modulated carrier signal using said difference signal.

10. The method of claim 8 further comprising the steps of:

calculating a power of said ideal modulation signal; and calculating a cluster variance (CV) as a ratio of said power of said difference signal to said power of said ideal modulation signal.

11. The method of claim 10 further comprising the step of:

calculating a bit error rate from said cluster variance.

12. The method of claim 7 further comprising the step of:

displaying a time domain representation of said difference signal.

13. The method of claim 7 further comprising the step of:

displaying a spectrum analyzer frequency domain representation of said difference signal to identify ingress interferers.

14. The method of claim 13 wherein said demodulator comprises an equalizer and said estimated modulation signal is derived from an output of said equalizer.

15. A communication channel diagnosis system comprising:

a demodulator that receives a distorted modulated carrier signal carrying digital data and extracts an estimated modulation signal;

a symbol decoder that translates a representation of said estimated modulation signal output into estimates of said digital data;

an ideal modulation signal generator that generates an ideal modulation signal representing said digital data;

a difference signal generator that generates an ideal difference signal between said ideal modulation signal and said estimated modulation signal as an estimate of an interfering signal, said difference signal being resolved into orthogonal components; and a diagnostic processor that receives said difference signal and calculates statistics of said difference signal using said orthogonal components using said diagnostics processor.

16. The diagnosis system of claim 15 wherein said diagnostic processor calculates a power of said difference signal.

17. The diagnosis system of claim 15 wherein said diagnostic processor estimates a bit error rate of said distorted modulated carrier signal using said difference signal.

18. The diagnosis system of claim 15 wherein said diagnostic processor:

calculates a power of said ideal modulation signal; and calculates a cluster variance (CV) as a ratio of said power of said difference signal to said power of said ideal modulation signal.

19. The diagnosis system of claim 18 wherein said diagnostic processor calculates a bit error rate from said cluster variance.

20. The diagnosis system of claim 15 wherein said diagnostic processor displays a time domain representation of said difference signal.

21. The diagnosis system of claim 15 wherein said diagnostic processor displays a spectrum analyzer frequency domain representation of said difference signal to identify ingress interferers.

22. The diagnosis system of claim 21 wherein said demodulator comprises an equalizer and said estimated modulation signal is derived from an output of said equalizer.

* * * * *